United States Patent
Diamant et al.

(10) Patent No.: US 10,877,552 B1
(45) Date of Patent: Dec. 29, 2020

(54) DYNAMIC POWER REDUCTION THROUGH DATA TRANSFER REQUEST LIMITING

(71) Applicant: Amazon Technologies, Inc., Seattle, WA (US)

(72) Inventors: Ron Diamant, Santa Clara, CA (US); Sundeep Amirineni, Austin, TX (US); Akshay Balasubramanian, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/575,714

(22) Filed: Sep. 19, 2019

(51) Int. Cl.
*G06F 1/329* (2019.01)
*G06F 1/3225* (2019.01)

(52) U.S. Cl.
CPC ............ *G06F 1/329* (2013.01); *G06F 1/3225* (2013.01)

(58) Field of Classification Search
CPC ................................ G06F 1/329; G06F 1/3225
See application file for complete search history.

(56) References Cited

U.S. PATENT DOCUMENTS

| 9,760,160 B2 * | 9/2017 | Weissmann | G06F 1/3243 |
| 2015/0032940 A1 * | 1/2015 | Karamcheti | G06F 3/061 711/103 |
| 2018/0004622 A1 * | 1/2018 | Brandt | G06F 11/3409 |

\* cited by examiner

*Primary Examiner* — Glenn A. Auve
(74) *Attorney, Agent, or Firm* — Kilpatrick Townsend & Stockton LLP

(57) ABSTRACT

Dynamic power dissipation in an integrated circuit device is related to switching activity and can degrade performance or cause premature failure. Methods and apparatuses for dynamic power reduction by limiting data transfer requests between execution engines and memory are provided. Data transfer limiter blocks can be associated with execution engines of the integrated circuit device. Each data transfer limiter block may include a set of counters to control a number of data transfer requests from an execution engine that are permitted to reach the memory in a specified period of time. The counters may incrementally increase the number of data transfer requests permitted to reach the memory subsystem from an initial number up to a maximum number of data transfer requests in the specified period of time.

20 Claims, 9 Drawing Sheets

US 10,877,552 B1

DYNAMIC POWER REDUCTION THROUGH DATA TRANSFER REQUEST LIMITING

BACKGROUND

Excessive power dissipation can lead to premature failure of an integrated circuit device. The power consumed in an integrated circuit device is composed of two types: dynamic power dissipation, sometimes referred to as switching power dissipation, and static power dissipation, sometimes referred to as leakage power dissipation. Dynamic power dissipation is proportional to the switching activity, switching frequency, and power supply voltage of the integrated circuit device, and can vary depending on operating conditions. Higher switching frequencies (i.e., clock speeds) and at which various operations (i.e., switching activities) of the integrated circuit device are performed can result in higher than desired dynamic power dissipation. Dynamic power dissipation can be especially high as an integrated circuit device transitions from a quiescent state to an operational state and can stress both the integrated circuit device and the power supply circuitry.

BRIEF DESCRIPTION OF THE DRAWINGS

Various embodiments in accordance with the present disclosure will be described with reference to the drawings, in which.

DETAILED DESCRIPTION

Figure 1:
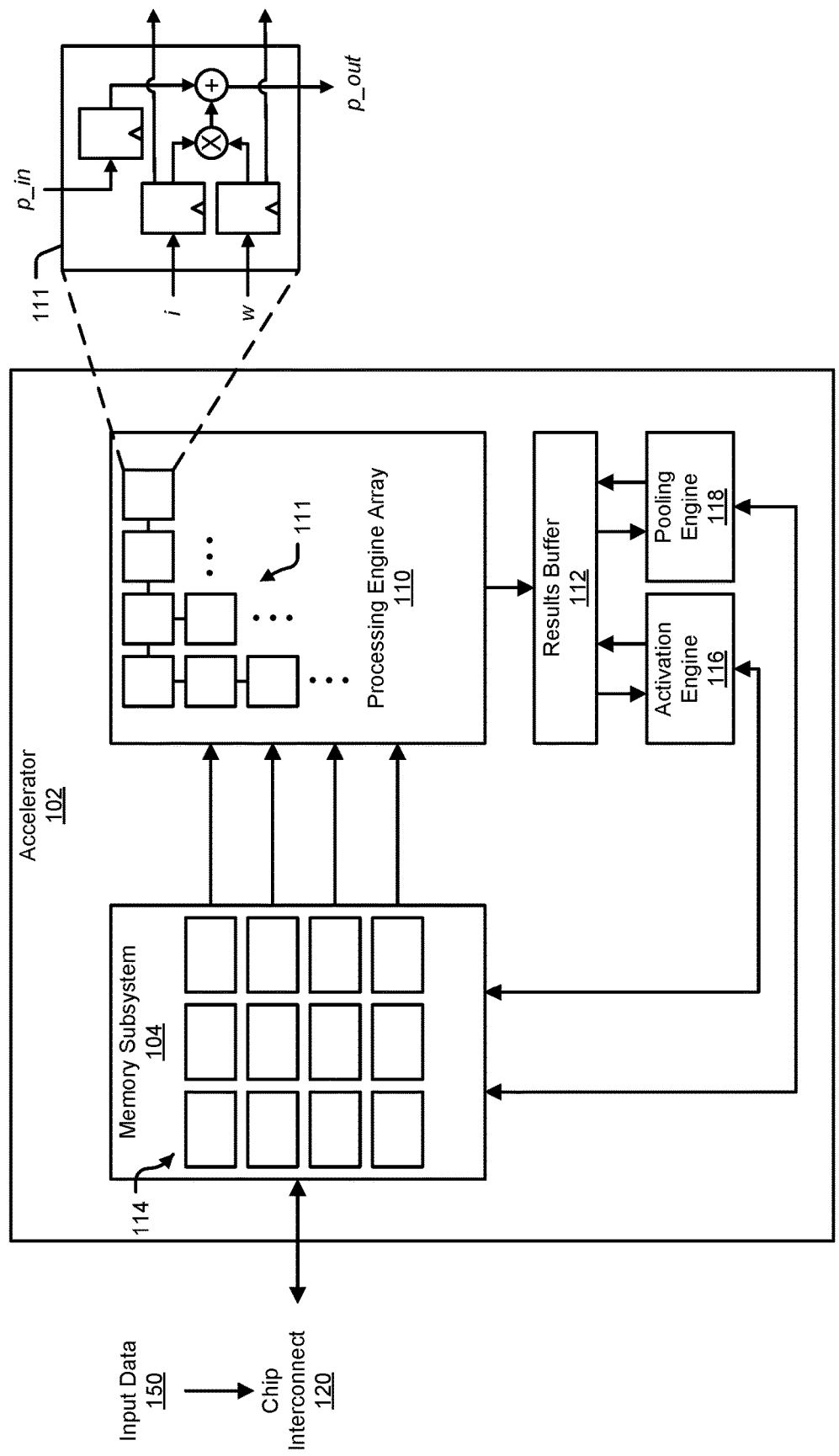
FIG. 1 includes a block diagram illustrating an example of an integrated circuit device that can implement data transfer request limiting according to some aspects of the present disclosure.

Two mechanisms are responsible for power dissipation in an integrated circuit device. Static power dissipation, sometimes referred to as leakage power dissipation, is power dissipated in the integrated circuit device when there is no circuit activity. For example, the integrated circuit device can dissipate power as a result of leakage currents of the devices making up the integrated circuit device. Static power dissipation may be substantially constant during the operation of the integrated circuit device.

Dynamic power dissipation, sometimes referred to as switching power dissipation, occurs as a result of circuit activity such as switching of transistors, logic devices, or other components in the integrated circuit device. Dynamic power dissipation is proportional to the switching activity, switching frequency (e.g., clock speed), and power supply voltage of the integrated circuit device and can vary depending on operating conditions of the integrated circuit device. For example, an integrated circuit device having a large number of devices operating at a high clock speed (e.g., 1 GHz) or multiples of the clock speed, can have high dynamic power dissipation. The high dynamic power dissipation may degrade performance or cause premature failure of the integrated circuit device.

Dynamic power dissipation can be a detrimental factor during startup operation when the integrated circuit device transitions from a quiescent state (e.g., dissipating only static power) to an operational state where a large number of components switching at high frequency add a high dynamic load to a power supply system. In addition to the high power dissipation in the integrated circuit device, the added load can cause failures of power supply components.

Aspects of the present disclosure can reduce dynamic power dissipation for an integrated circuit device by limiting data transfer requests (e.g., read requests and/or write requests) between a memory and clients of the memory that initiate the data transfer requests. Limiting the data transfer requests, and thereby limiting the data transfer rate, can reduce the switching activity of the integrated circuit device, thereby reducing the dynamic power dissipation.

A data transfer request limiter block may be implemented to limit the number of data transfer requests that reach the memory. In some implementations, data transfer requests may be limited using a software mechanism. The software mechanism may intercept data transfer requests generated by a client and to limit the number of data transfer requests that are permitted to reach the memory. The number of permitted data transfer requests, and accordingly the number of data transfers, may be slowly increased until a maximum number of data transfer requests, or equivalently a maximum data transfer rate, is reached. In some implementations, a hardware mechanism may be used to limit the initial number of permitted data transfer requests to the memory and slowly increase the number until a maximum data transfer rate is reached. Either implementation may be employed during startup of the integrated circuit device and/or during other operational modes to control power dissipation.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 is a block diagram illustrating an example of an integrated circuit device that can implement data transfer request limiting according to some aspects of the present disclosure. The example of FIG. 1 illustrates an accelerator 102 (i.e., an integrated circuit device). In various examples, the accelerator 102, for a set of input data (e.g., input data 150), can execute computations using a processing engine array 110, an activation engine 116, and/or a pooling engine 118. In some examples, the example accelerator 102 may be an integrated circuit component of a processor, such as a neural network processor. The processor may have other integrated circuit components, including additional accelerator engines.

In various implementations, the memory subsystem 104 can include multiple memory banks 114. In these implementations, each memory bank 114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 104 can permit simultaneous access to the read or write channels of multiple memory banks. As another example, the memory subsystem 104 can include arbitration logic such that arbitration between, for example, the outputs of multiple memory banks 114 can result in more than one memory bank's output being used. In these and other examples, though globally managed by the memory subsystem 104, each memory bank can be operated independently of any other.

Having the memory banks 114 be independently accessible can increase the efficiency of the accelerator 102. For example, values can be simultaneously read and provided to each row of the processing engine array 110, so that the entire processing engine array 110 can be in use in one clock cycle. As another example, the memory banks 114 can be read at the same time that results computed by the processing engine array 110 are written to the memory subsystem 104. In contrast, a single memory may be able to service only one read or write at a time. With a single memory, multiple clock cycles can be required, for example, to read input data for each row of the processing engine array 110 before the processing engine array 110 can be started.

In various implementations, the memory subsystem 104 can be configured to simultaneously service multiple clients, including the processing engine array 110, the activation engine 116, the pooling engine 118, and any external clients that access the memory subsystem 104 over a communication fabric 120. In some implementations, being able to service multiple clients can mean that the memory subsystem 104 has at least as many memory banks as there are clients. In some cases, each row of the processing engine array 110 can count as a separate client. In some cases, each column of the processing engine array 110 can output a result, such that each column can count as a separate write client. In some cases, output from the processing engine array 110 can be written into the memory banks 114 that can then subsequently provide input data for the processing engine array 110. As another example, the activation engine 116 and the pooling engine 118 can include multiple execution channels, each of which can be separate memory clients. The memory banks 114 can be implemented, for example, using static random access memory (SRAM).

In various implementations, the memory subsystem 104 can include control logic. The control logic can, for example, keep track of the address spaces of each of the memory banks 114, identify memory banks 114 to read from or write to, and/or move data between the memory banks 114. In some implementations, memory banks 114 can be hardwired to particular clients. For example, a set of memory banks 114 can be hardwired to provide values to the rows of the processing engine array 110, with one memory bank servicing each row. As another example, a set of memory banks can be hard wired to receive values from columns of the processing engine array 110, with one memory bank receiving data for each column.

The processing engine array 110 is the computation matrix of the example accelerator 102. The processing engine array 110 can, for example, execute parallel integration, convolution, correlation, and/or matrix multiplication, among other things. The processing engine array 110 includes multiple processing engines 111, arranged in rows and columns, such that results output by one processing engine 111 can be input directly into another processing engine 111. Processing engines 111 that are not on the outside edges of the processing engine array 110 thus can receive data to operate on from other processing engines 111, rather than from the memory subsystem 104.

In various examples, the processing engine array 110 uses systolic execution, in which data arrives at each processing engine 111 from different directions at regular intervals. In some examples, input data can flow into the processing engine array 110 from the left and weight values can be loaded at the top. In some examples weights and input data can flow from the left and partial sums can flow from top to bottom. In these and other examples, a multiply-and-accumulate operation moves through the processing engine array 110 as a diagonal wave front, with data moving to the right and down across the array. Control signals can be input at the left at the same time as weights, and can flow across and down along with the computation.

In various implementations, the number of columns in the processing engine array 110 determines the computational capacity of the processing engine array 110, and the number of rows determines the required memory bandwidth for achieving maximum utilization of the processing engine array 110. The processing engine array 110 can have, for example, 64 columns and 428 rows, or some other number of columns and rows.

An example of a processing engine 111 is illustrated in FIG. 1 in an inset diagram. As illustrated by this example, a processing engine 111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 111.

In the illustrated example, an input from above can include a partial sum, pin, provided either from another processing engine 111 or from a previous round of computation by the processing engine array 110. When starting a computation for a new set of input data, the top row of the processing engine array 110 can receive a fixed value for p_in, such as zero. As illustrated by this example, i and w are multiplied together and the result is summed with p_in to produce a new partial sum, p_out, which can be input into another processing engine 111. Various other implementations of the processing engine 111 are possible.

Outputs from the last row in the processing engine array 110 can be temporarily stored in the results buffer 112. The results can be intermediate results, which can be written to the memory banks 114 to be provided to the processing engine array 110 for additional computation. Alternatively, the results can be final results, which, once written to the memory banks 114 can be read from the memory subsystem 104 over the communication fabric 120, to be output by the system.

In some implementations, the accelerator 102 includes an activation engine 116. In these implementations, the activation engine 116 can combine the results from the processing engine array 110 into one or more output activations. For example, for a convolutional neural network, convolutions from multiple channels can be summed to produce an output activation for a single channel. In other examples, accumulating results from one or more columns in the processing engine array 110 may be needed to produce an output activation for a single node in the neural network. In some examples, activation engine 116 can be bypassed.

In various examples, the activation engine 116 can include multiple separate execution channels. In these examples, the execution channels can correspond to the columns of the processing engine array 110, and can perform an operation on the outputs of a column, the result of which can be stored in the memory subsystem 104. In these examples, the activation engine 116 may be able to perform between 1 and n parallel computations, where n is equal to the number of columns in the processing engine array 110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 102 can include a pooling engine 118. Pooling is the combining of outputs of the columns of the processing engine array 110. Combining can include for example, computing a maximum value, a minimum value, an average value, a median value, a summation, a multiplication, or another logical or mathematical combination. In various examples, the pooling engine 118 can include multiple execution channels that can operating on values from corresponding columns of the processing engine array 110. In these examples, the pooling engine 118 may be able to perform between 1 and n parallel computations, where n is equal to the number of columns in the processing engine array 110. In various examples, execution channels of the pooling engine 118 can operate in parallel and/or simultaneously. In some examples, the pooling engine 118 can be bypassed.

Herein, the activation engine 116 and the pooling engine 118 may be referred to collectively as execution engines. The processing engine array 110 is another example of an execution engine. Another example of an execution engine is a Direct Memory Access (DMA) engine, which may be located outside the accelerator 102.

Input data 150 can arrive over the communication fabric 120. The communication fabric 120 can connect the accelerator 102 to other components of a processor, such as a DMA engine that can obtain input data 150 from an Input/Output (I/O) device, a storage drive, or a network interface. The input data 150 can be, for example one-dimensional data, such as a character string or numerical sequence, or two-dimensional data, such as an array of pixel values for an image or frequency and amplitude values over time for an audio signal. In some examples, the input data 150 can be three-dimensional, as may be the case with, for example, the situational information used by a self-driving car or virtual reality data. In some implementations, the memory subsystem 104 can include a separate buffer for the input data 150. In some implementations, the input data 150 can be stored in the memory banks 114 when the accelerator 102 receives the input data 150.

In some examples, the accelerator 102 can implement a neural network processing engine. In these examples, the accelerator 102, for a set of input data 150, can execute a neural network to perform a task for which the neural network was trained. Executing a neural network on a set of input data can be referred to as inference or performing inference.

The weights for the neural network can be stored in the memory subsystem 104, along with input data 150 on which the neural network will operate. The neural network can also include instructions, which can program the processing engine array 110 to perform various computations on the weights and the input data. The instructions can also be stored in the memory subsystem 104, in the memory banks 114 or in a separate instruction buffer. The processing engine array 110 can output intermediate results, which represent the outputs of individual layers of the neural network. In some cases, the activation engine 116 and/or pooling engine 118 may be enabled for computations called for by certain layers of the neural network. The accelerator 102 can store the intermediate results in the memory subsystem 104 for inputting into the processing engine array 110 to compute results for the next layer of the neural network. The processing engine array 110 can further output final results from a last layer of the neural network. The final results can be stored in the memory subsystem 104 and then be copied out to host processor memory or to another location.

Data transfer request limiting may be implemented for the integrated circuit device by inserting instances of software or hardware data transfer request limiter blocks in the communication paths between the memory (e.g., the memory subsystem 104) and the clients of the memory (e.g., the processing engine array 110, the activation engine 116, the pooling engine 118).

Figure 2:
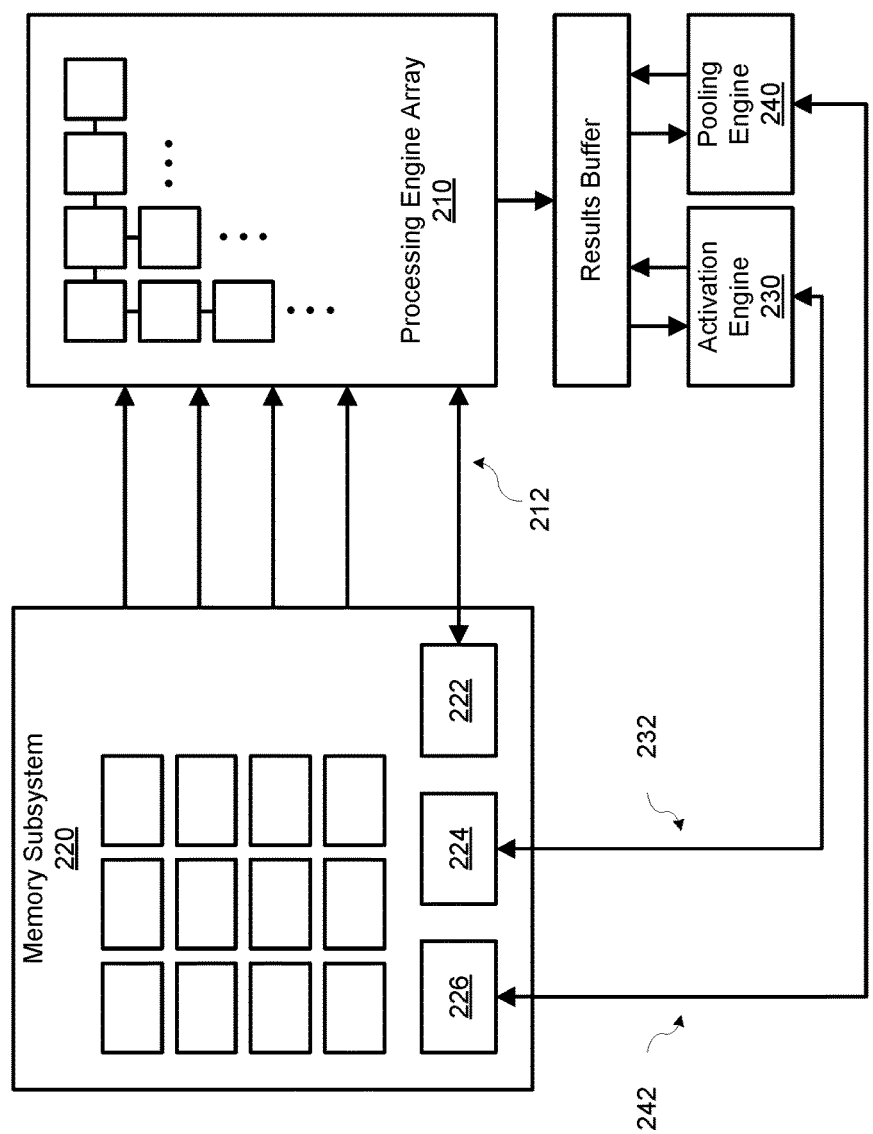
FIG. 2 includes a block diagram that illustrates an example of data transfer request limiter blocks in an integrated circuit device according to some aspects of the present disclosure.

In accordance with aspects of the present disclosure, instances of data transfer request limiter blocks may be inserted in communication paths between the memory subsystem 220 (e.g., state buffer) and clients (e.g., execution engines such as the processing engine (PE) array 210, the activation engine 230, and the pooling engine 240) of the memory subsystem. The data transfer request limiter blocks may receive the data transfer requests (e.g., read and/or write requests) and limit the number of data transfer requests that are permitted to reach the memory subsystem in a given number of clock cycles. FIG. 2 includes a block diagram that illustrates an example of data transfer request limiter blocks in an integrated circuit device according to some aspects of the present disclosure.

Referring to FIG. 2, instances of the data transfer limiter blocks 222, 224, 226 may be included in the memory subsystem 220. In some implementations, the data transfer limiter blocks may be instantiated elsewhere, for example, but not limited to, in each of the clients of the memory subsystem. An instance of a data transfer limiter block may be associated with each of the clients of the memory subsystem 220. For example, a first instance of a data transfer limiter block 222 may be associated with the PE array 210, a second instance of a data transfer limiter block 224 may be associated with the activation engine 230, and a third instance of a data transfer limiter block 226 may be associated with the pooling engine 240. It should be appreciated that while the present example illustrates one data transfer limiter block associated with each of three clients of the memory subsystem, more than one data transfer limiter block may be associated with each client, and other clients (not shown) of the memory subsystem may be associated with instances of data transfer limiter blocks.

Each instance of a data transfer limiter block may be located in a communication path between the memory subsystem and the associated client. For example, the first instance of a data transfer limiter block 222 may be located in the communication path 212 between the memory subsystem 220 and the PE engine array 210, a second instance of a data transfer limiter block 224 may be located in the communication path 232 between the memory subsystem 220 and the activation engine 230, and a third instance of a data transfer limiter block 226 may be located in the communication path 242 between the memory subsystem 220 and the pooling engine 240.

The data transfer limiter blocks may receive data transfer requests from the associated clients. The data transfer request may be bursty in nature, i.e., a large number of data transfer requests may be received from any of the clients during consecutive clock cycles. The data transfer limiter blocks may permit only a specified number of data transfer requests to reach the memory subsystem during a specified number of clock cycles. The specified number of data transfer requests permitted to reach the memory subsystem may be set independently for each client or may be set as a cumulative number of data transfer requests for all clients. By limiting the number of data transfer requests to the memory subsystem, the number of data transfers occurring during the specified number of clock cycles can also be reduced, thereby reducing the switching activity of the integrated circuit device and reducing dynamic power dissipation while maintaining the clock speed of the integrated circuit device.

Figure 3:
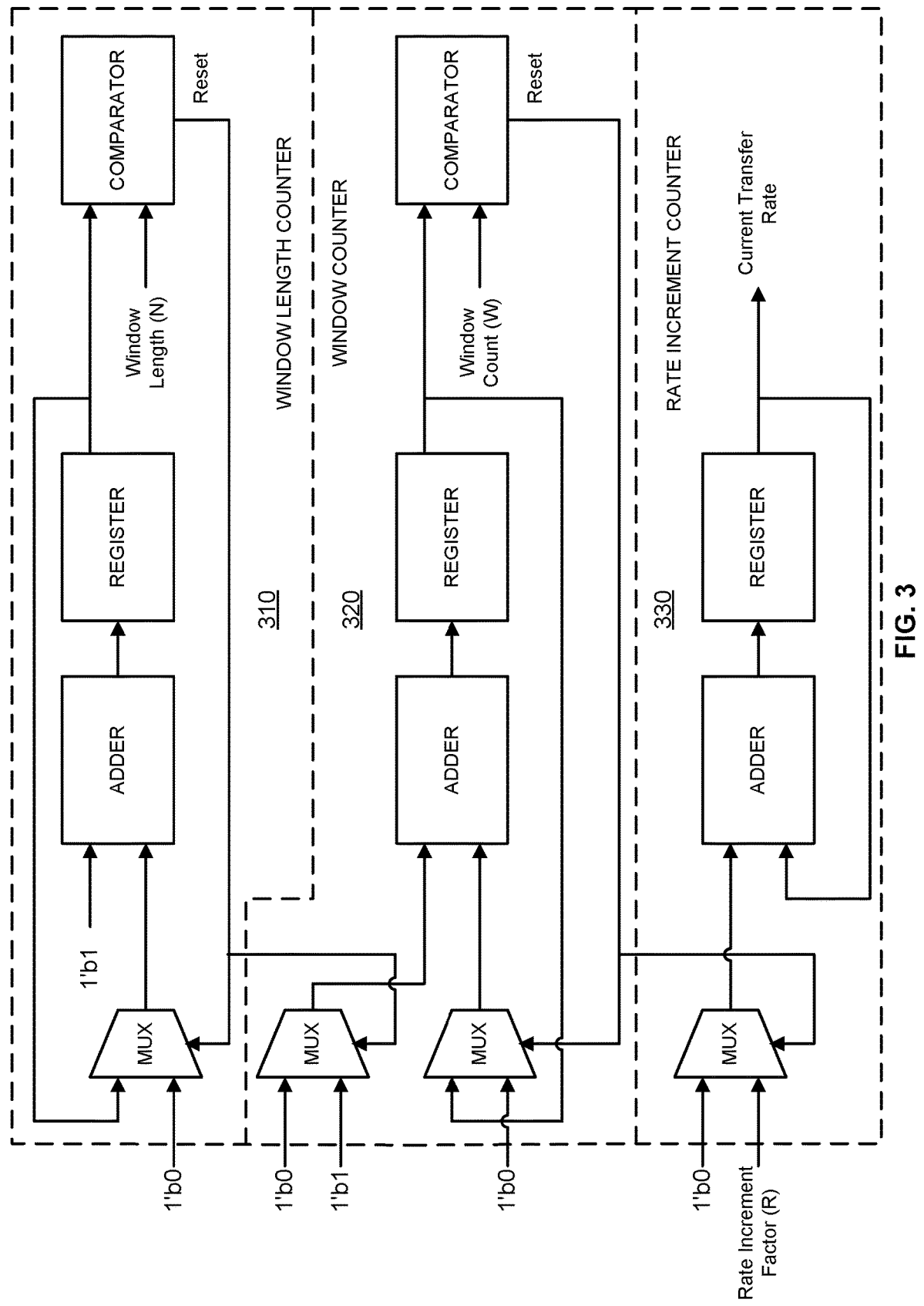
FIG. 3 includes a block diagram that illustrates an example of a hardware implementation of a data transfer request limiter block according to some aspects of the present disclosure.

FIG. 3 includes a block diagram that illustrates an example of a hardware implementation of a data transfer request limiter block according to some aspects of the present disclosure. In the hardware implementation of the data transfer request limiter block, the hardware mechanism may control the incrementing of the data transfer rate from an initial data transfer rate to a maximum data transfer rate. The data transfer rate may be controlled by controlling the number of data transfer requests permitted to reach the memory subsystem from an initial number up to a maximum number of data transfer requests.

Referring to FIG. 3, the data transfer request limiter block may include a window length counter 310, a window counter 320, and a rate increment counter 330. The window length counter 310 may include one or more multiplexers, adder circuits, registers, and comparators configured to count a specified number of clock cycles up to a window length, N. The window length N may be specified as a number of clock cycles during which a specified number of data transfer requests may be permitted to reach the memory subsystem. The number of clock cycles may be arbitrarily selected. A value for the window length N may be set in a configuration register (not shown) by software, for example, a compiler or a runtime driver. The configuration register may be implemented in the memory subsystem 220 or may be implemented in another location. When the clock cycle count of the window length counter 310 reaches the window length N, the window length counter 310 may reset to zero and begin counting again. A reset signal generated by the window length counter 310 each time the count reaches N may increment the window counter 320.

The window counter 320 may include one or more multiplexers, adder circuits, registers, and comparators configured to count windows up to a specified number of windows, W. Each window may contain the specified number of clock cycles, N. Thus, each time the window length counter 310 counts N clock cycles, the count W of the window counter 320 may be incremented. The number of windows W may be arbitrarily selected or be selected based on a desired power dissipation goal. A value for the number of windows W may be set in a configuration register (not shown) by software, for example, the compiler or the runtime driver. The configuration register may be implemented in the memory subsystem 220 or may be implemented in another location. When the count of the window counter 320 reaches the number of windows W, the window counter 320 may reset to zero and begin counting again. A reset signal generated by the window counter 320 each time the window count reaches W may increment the rate increment counter 330.

The rate increment counter 330 may include one or more multiplexers, adder circuits, and registers configured to count and increment the number of permitted data transfer requests. The rate increment counter 330 may count the number of permitted data transfer requests up to a current number of data transfer requests permitted to reach the memory subsystem to be serviced, and can cause the integrated circuit device to prevent data transfer requests exceeding the current number from reaching the memory subsystem. The rate increment counter 330 can increase the number of permitted data transfer requests per window, and therefore the data transfer rate, up to the maximum value of N data transfer requests per window (i.e., one permitted data transfer request every clock cycle). The rate increment counter 330 may increment the number of permitted data transfer requests by a rate increment factor R starting from an initial number of permitted data transfer requests K.

The initial number of permitted data transfer requests K and the rate increment factor R may be set in a configuration register (not shown) by software, for example, the compiler or the runtime driver. The configuration register may be implemented in the memory subsystem 220 or may be implemented in another location. The initial number of permitted data transfer requests K and the number of clock cycles N in a window maybe set such that the number of data requests permitted to reach the memory subsystem is less than the number of clock cycles (K<N) in the window. Both the initial number of permitted data transfer requests K and the rate increment factor R may be set as a fixed number or a percentage of the maximum number of data transfer requests that may be received in a window. The rate increment counter 330 may determine when the maximum number of permitted data transfer requests has been reached. The maximum number of permitted data transfer requests that can be received in a window may be equal to the number of clock cycles N in the window (i.e., one data transfer request every clock cycle).

As an example, software (e.g., the compiler or runtime driver) may set a window length N=1000 clock cycles, a number of windows W=10 windows, an initial number of permitted data transfer requests K=20% of the maximum number of data transfer requests that may be received in a window, and the rate increment factor R=10% of the maximum number of data transfer requests that may be received in a window. Suppose 800 data transfer requests may be received during the 1000 consecutive clock cycles (i.e., one window length N). Since the data transfer requests can be bursty in nature, the 800 data transfer requests may be received during the first 800 clock cycles. The data transfer limiter block may permit the first 200 data transfer requests (i.e., 20% of the maximum) in the window to reach the memory subsystem to be serviced. In some implementations, the data transfer limiter block may permit the first 200 data transfer requests may to reach the memory subsystem in the first 200 clock cycles. In some implementations, the data transfer limiter block may permit the first 200 data transfer requests to reach the memory subsystem one data transfer request every n clock cycles, where n is equal to or greater than two. The remaining data transfer requests can be queued for later servicing. Alternatively, the remaining data transfer requests may be discarded and data transfer requests retransmitted by the client.

Each time the count of the window length counter 310 reaches N=1000, the window length counter 310 may generate a reset signal to reset the window length counter 310 to zero and begin counting clock cycles again. The reset signal generated by the window length counter 310 may increment the window counter 320. The data transfer request limiter block may permit the first 200 data transfer requests in each window of window length N=1000 clock cycles to reach the memory subsystem up to the number of windows W=10.

Each time the count of the window counter 320 reaches W=10, the window counter 320 may generate a reset signal to reset the window counter 320 to zero and begin counting windows again. The reset signal generated by the window counter 320 may increment the rate increment counter 330. Each time the rate increment counter 330 is incremented, it may cause the number of permitted data transfer requests per window, and therefore the data transfer rate, to increase by the rate increment factor R=10% of the maximum number of data transfer requests.

At the first increment, the rate increment counter 330 may increase the amount of permitted data transfer requests from the initial value of K=20% to 30% (i.e., from 200 to 300 data transfer requests) during each window (i.e., 1000 clock cycles). At the second increment after 10 more windows have been counted, the rate increment counter 330 may increase the amount of permitted data transfer requests by another 10% from 30% to 40% (i.e., from 300 to 400 data requests) during each window (i.e., 1000 clock cycles). The number of permitted data transfer requests may be increased incrementally by the rate increment counter 330 until the number of permitted data transfer requests, and therefore the data transfer rate, equals the number of clock cycles N in each window.

Thus, the permitted number of data transfer requests, and hence the data transfer rate, may be increased by the rate increment factor R every N×W clock cycles until the maximum transfer rate equal to the number of clock cycles in a window is reached. The values for N, W, K, and R can determine the initial dynamic power dissipation of the integrated circuit device as well as the rate the dynamic power dissipation is increased by controlling the data transfer rate between the execution engines and the memory subsystem. It should be noted that the specific values for N, W, K, and R given above are merely exemplary for purposes of explanation, and that other values can be used.

The data transfer limiter block implementation in hardware may be disabled by setting the initial number of data transfer requests K equal to the number of clock cycles N in a window (i.e., K=N=1000 in this example). In some implementations, the permitted number of data transfer requests may be set to a constant value to reduce power dissipation by the integrated circuit device by, for example, disabling the rate increment counter 330. In this case, the permitted number of data transfer requests may be determined, for example, based on the clock speed of the integrated circuit device.

In accordance with aspects of the present disclosure, the data transfer limiter block may be implemented using a software mechanism. For example, the data transfer limiter block software mechanism may be implemented by a runtime driver program. In some implementations of a data transfer limiter block using a software mechanism, the initial number of data transfer requests per window permitted to reach the memory subsystem and the initial number of clock cycles over which the data transfer requests are permitted may be variables set in software, for example by the runtime driver program. The initial number of data transfer requests, K, and the initial number of clock cycles, N, maybe set such that the number of data requests permitted to reach the memory subsystem is less than the initial number of clock cycles (K<N).

The permitted number of data transfer requests may be configured as a number or a percentage of the maximum number of data transfer requests that may be received. Once configured, these values can be fixed during operation of the integrated circuit device until the configuration is modified. A specified number of data transfer requests permitted to reach the memory subsystem may be set for each client or may be set as a cumulative number of data transfer requests for all clients. The maximum number of data transfer requests that can be received may be equal to the initial number of clock cycles N (i.e., one data transfer request every clock cycle). For example, K may be set to permit 20% of the maximum number of data transfer requests received over N=1000 consecutive clock cycles to reach the memory subsystem. In this example, 800 data transfer requests may be received during the 1000 consecutive clock cycles. Since the data transfer requests can be bursty in nature, the 800 data transfer requests may be received during the first 800 clock cycles.

The data transfer limiter block software may permit the first 200 data transfer requests (i.e., 20% of the maximum) to reach the memory subsystem to be serviced. In some implementations, the data transfer limiter block software may permit the first 200 data transfer requests may to reach the memory subsystem in the first 200 clock cycles. In some implementations, the data transfer limiter block software may permit the first 200 data transfer requests to reach the memory subsystem one data transfer request every n clock cycles, where n is equal to or greater than two. The remaining data transfer requests can be queued for later servicing. Alternatively, the remaining data transfer requests may be discarded and data transfer requests retransmitted by the client. It should be noted that the specific values for K and N are merely exemplary for purposes of explanation, and that other values can be used.

In some implementations of the data transfer request limiter block as a software mechanism, the data transfer rate may be increased over time by incrementing the amount of data transfer requests permitted to reach the memory subsystem. In some cases, certain instruction types, when executed, may cause the data transfer limiter block software to increment the number of permitted data transfer requests.

In some cases, the data transfer limiter block software may increment the number of permitted data transfer requests after a specified number of instructions have been processed. For example, a value for the specified number of instructions may be set in the data transfer limiter block software, and a program counter can be monitored to determine if the specified number of instructions have been executed. In some cases, the data transfer limiter block software may increment the number of permitted data transfer requests after a specified amount of time has elapsed. For example, a value for the specified elapsed time may be set in the data transfer limiter block software. The elapsed time or specified number of instructions may be determined by the data transfer limiter block software by polling registers containing the corresponding values such as a system clock counter. In some implementation, the registers may be part of the memory subsystem. In some implementation, the registers may be in other portions of the integrated circuit device.

For each increment of the data transfer rate, the data transfer limiter block software may add another number of permitted data transfer requests (e.g., a fixed number or a percentage of the maximum number of data transfer requests) to the current number of data transfer requests. Thus, the number of data transfer requests, and therefore data transfer rate, may be incrementally increased up to the maximum value of N data transfer requests. The maximum data transfer rate may be determined by the data transfer limiter block software by polling a register containing a value corresponding to the maximum data transfer rate. In some implementation, the register may be part of the memory subsystem. In some implementation, the register may be in other portions of the integrated circuit device. For example, returning to the previous example, at each increment, the number of data transfer requests permitted to reach the memory subsystem (and therefore the data transfer rate) may be increased by 10% of the maximum number of data transfer requests which is equal to the initial number N of clock cycles.

At the first increment, the data transfer limiter block software may increase the amount of permitted data transfer requests from 20% to 30% (i.e., from 200 to 300 data transfer requests) during 1000 clock cycles. At the second increment, the data transfer limiter block software may increase the amount of permitted data transfer requests by another 10% from 30% to 40% (i.e., from 300 to 400 data requests) during 1000 clock cycles. The number of permitted data transfer requests may be increased incrementally by the data transfer limiter block software until the number of permitted data transfer requests, and therefore the data transfer rate, equals the number of clock cycles N. The a data transfer limiter block implementation in software may be disabled by setting the initial number of data transfer requests K equal to the initial number of clock cycles N (i.e., K=N=1000 in this example). One of ordinary skill in the art will appreciate that the values for N and K are merely exemplary for purposes of explanation.

In some implementations, the permitted number of data transfer requests may be set to a constant value based, for example, on the clock speed of the integrated circuit device to reduce power dissipation by the integrated circuit device. The permitted number of data transfer requests may be set to a constant value by, for example, setting the increment value of the number of permitted data transfer requests to zero.

Figure 4:
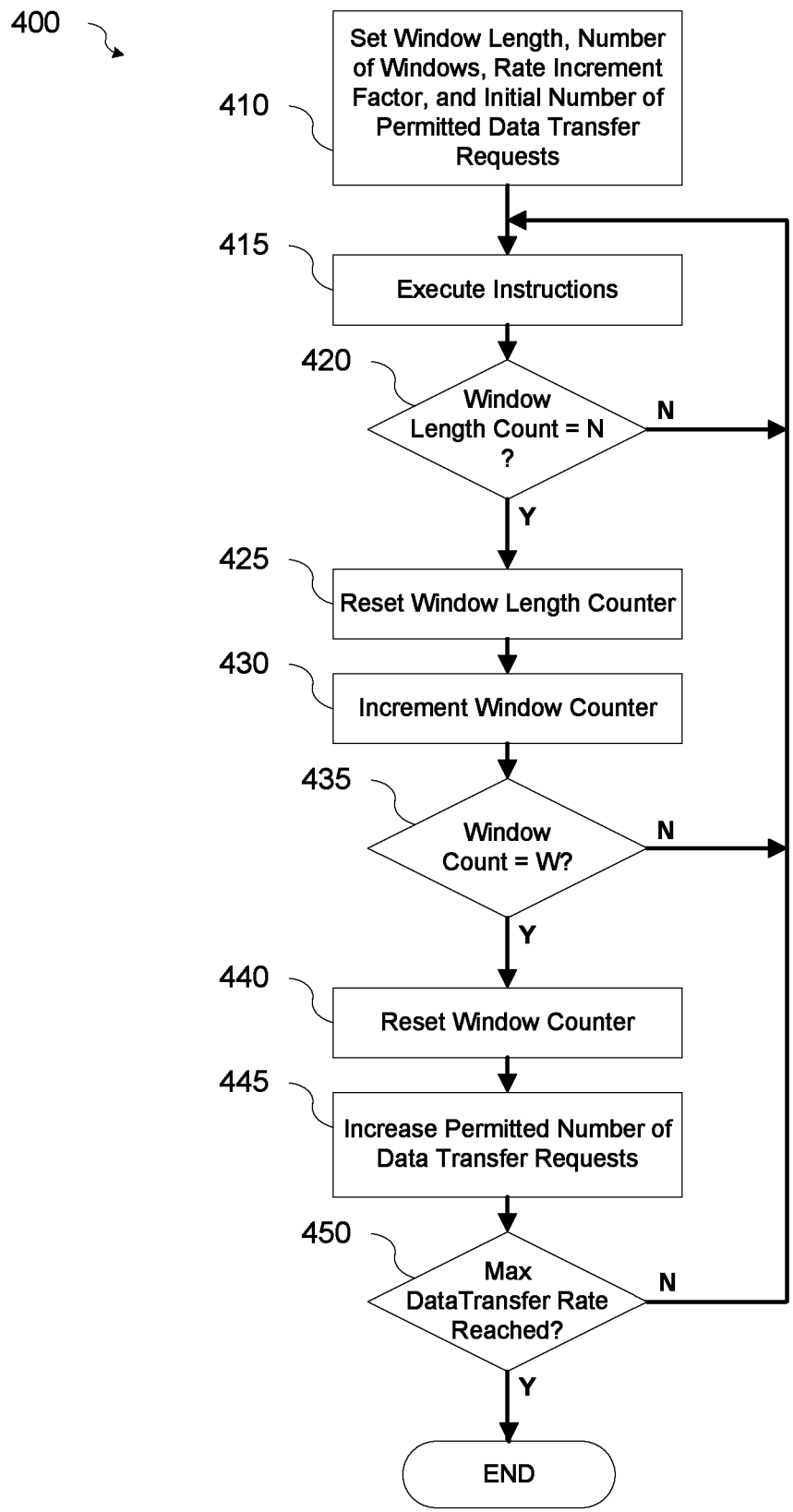
FIG. 4 is a flowchart of an example of a hardware-based method for reducing dynamic power by limiting data transfer requests according to some aspects of the present disclosure.

FIG. 4 is a flowchart of an example of a hardware-based method 400 for reducing dynamic power by limiting data transfer requests according to some aspects of the present disclosure. These methods may be implemented by the systems described above, such as for example in FIGS. 2 and 3.

At block 410, the window length, number of windows, rate increment factor, and initial transfer rate may be set. The values for the window length N, the number of windows W, the rate increment factor R, and the initial data transfer rate (i.e., the initial number of permitted data transfer requests) K may be set by software, for example, a compiler or a runtime driver. The window length N may be specified as a number of clock cycles during which a specified number of data transfer requests may be permitted to reach the memory subsystem. The number of clock cycles may be arbitrarily selected, or be selected based on a power dissipation goal. The number of windows W may also be arbitrarily selected, or be selected based on a power dissipation goal. Each window may contain the specified number of clock cycles, N.

The initial number of permitted data transfer requests K, and the number of clock cycles N in a window maybe set such that the number of data requests permitted to reach the memory subsystem is less than the number of clock cycles (K<N) in the window. Both the initial number of data transfer requests K and the rate increment factor R may be set as a number of data transfer requests or as a percentage of the maximum number of data transfer requests that may be received in a window. The maximum number of data transfer requests that can be received in a window may be equal to the number of clock cycles N in the window (i.e., one data transfer request every clock cycle).

At block 415, the integrated circuit may execute instructions. For example, the clients of the memory subsystem may generate data transfer requests. The data transfer request limiter block may receive the data transfer requests and determine, based on the states of the window length counter, the window counter, and the rate increment counter, the permitted number of data transfer requests to reach the memory subsystem to be serviced by the memory subsystem.

At block 420, it may be determined whether the count of the window length counter is equal to the set window length. The window length counter may include one or more multiplexers, adder circuits, registers, and comparators configured to count a specified number of clock cycles up to a window length, N. The window length N may be specified as a number of clock cycles during which a specified number of data transfer requests may be permitted to reach the memory subsystem. In response to determining that the count of the window length counter is not equal to the set window length (420-N), the method may continue executing instructions at block 415.

In response to determining that the count of the window length counter is equal to the set window length (420-Y), at block 425, the window length counter may be reset. When the clock cycle count of the window length counter reaches the window length N, the window length counter may reset to zero and begin counting again. A reset signal may be generated by the window length counter each time the count reaches N.

At block 430, the window counter may be incremented. The reset signal generated by the window length counter may increment the window counter each time the count of the window length counter reaches N.

At block 435, it may be determined whether the count of the window counter is equal to the set window count. The window counter may include one or more multiplexers, adder circuits, registers, and comparators configured to count windows up to a specified number of windows W. Each window may contain the specified number of clock cycles N. In response to determining that the count of the window counter is not equal to the set window count (435-N), the method may continue executing instructions at block 415.

In response to determining that the count of the window counter is equal to the set window count W (435-Y), at block 440, the window counter may be reset. A reset signal may be generated by the window counter each time the window count reaches W.

At block 445, the rate increment counter may be incremented. The reset signal generated by the window counter may increment the rate increment counter each time the count of the window counter reaches W. The rate increment counter may include one or more multiplexers, adder circuits, and registers configured to increase the number of permitted data transfer requests, and therefore data transfer rate, up to the maximum value of N data transfer requests (i.e., one permitted data transfer request every clock cycle). The rate increment counter may increase the number of permitted data transfer requests by a rate increment factor R starting from an initial number of permitted data transfer requests K. The rate increment factor R may be set as a number of data transfer requests or a percentage of the maximum number of data transfer requests that may be received in a window.

At block 450, it may be determined whether the maximum data transfer rate has been reached. The rate increment counter may determine when the maximum number of permitted data transfer requests has been reached. The maximum number of permitted data transfer requests that can be received in a window may be equal to the number of clock cycles N in the window (i.e., one data transfer request every clock cycle).

In response to determining that the maximum data transfer rate has not been reached (450-N), the method may continue executing instructions at block 415. In response to determining that the maximum data transfer rate has been reached (450-Y), the method may end.

It should be appreciated that the specific steps illustrated in FIG. 4 provide a particular hardware-based method of for reducing dynamic power by limiting data transfer requests according to another embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
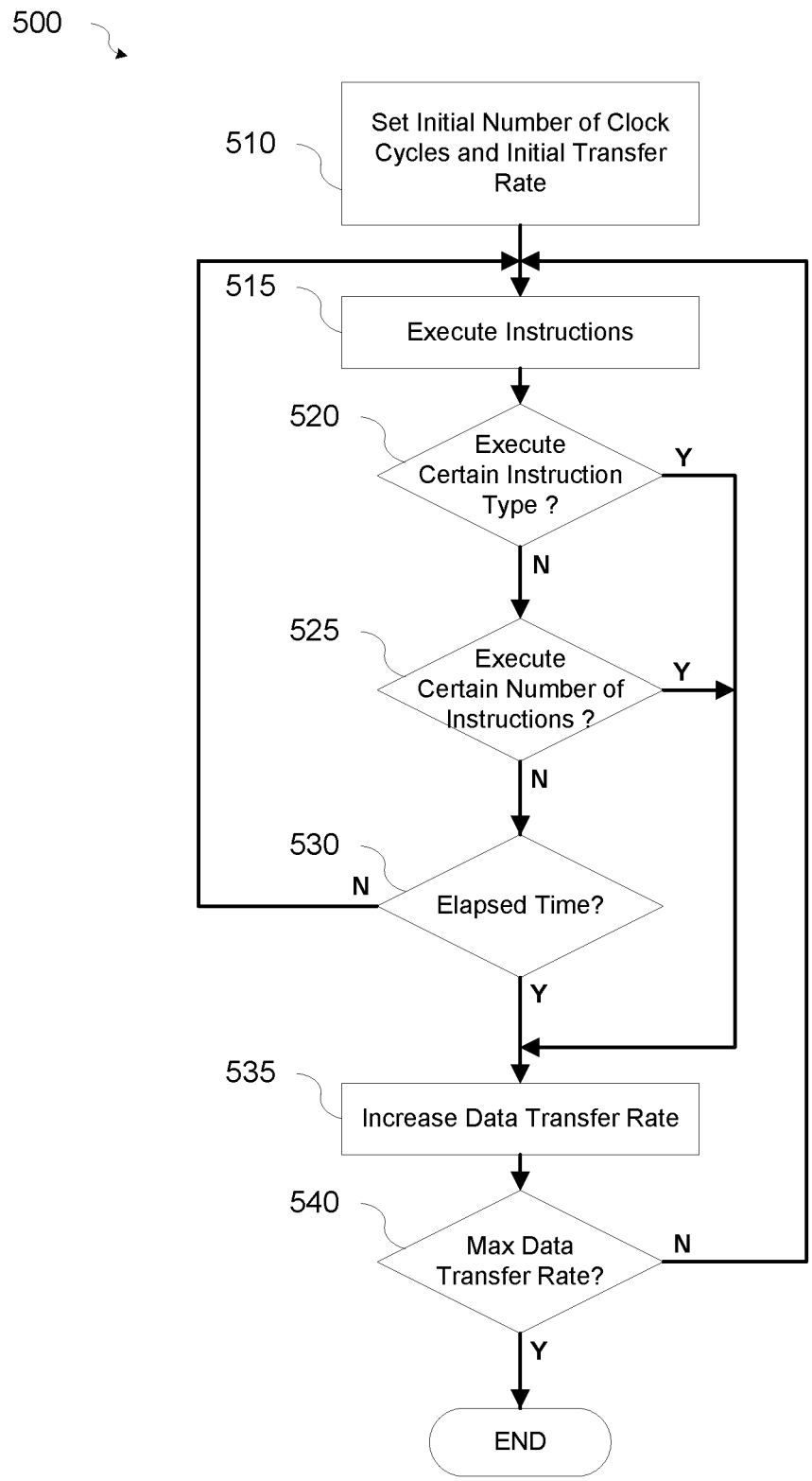
FIG. 5 is a flowchart of an example of a software-based method for reducing dynamic power by limiting data transfer requests according to some aspects of the present disclosure.

FIG. 5 is a flowchart of an example of a software-based method 500 for reducing dynamic power by limiting data transfer requests according to some aspects of the present disclosure. These methods may be implemented by the systems described above, such as for example in FIG. 2.

At block 510, the initial number of clock cycles and the initial transfer rate may be set. The initial number of data transfer requests permitted to reach the memory subsystem (i.e., the initial transfer rate) and the initial number of clock cycles over which the data transfer requests are permitted may be variables set in software, for example in a runtime driver program. The initial number of data transfer requests K and the initial number of clock cycles N maybe set such that the number of data requests permitted to reach the memory subsystem is less than the initial number of clock cycles (K<N). The permitted number of data transfer requests may be set as an number or a percentage of the maximum number of data transfer requests that may be received. The maximum number of data transfer requests that can be received may be equal to the initial number of clock cycles N (i.e., one data transfer request every clock cycle).

At block 515, the integrated circuit may execute instructions. For example, the clients of the memory subsystem may generate data transfer requests. The data transfer request limiter block software may receive the data transfer requests and determine, based on the number of clock cycles counted and the permitted number of data transfer requests, whether data transfer requests reach the memory subsystem to be serviced by the memory subsystem.

At block 520, it may be determined whether a certain instruction type has been executed. In response to determining that the certain instruction type has been executed (520-Y), at block 535, the data transfer rate may be increased. For each increment of the data transfer rate, the data transfer limiter block software may add another number of permitted data transfer requests (e.g., a fixed number or a percentage of the maximum number of data transfer requests) to the current number of data transfer requests. Thus, the number of data transfer requests, and therefore data transfer rate, may be incrementally increased up to the maximum value of N data transfer requests.

In response to determining that the certain instruction type has not been executed (520-N), at block 525, it may be determined whether a certain number of instructions has been executed. For example, a value for the specified number of instructions may be set in the data transfer limiter block software. The specified number of instructions may be determined by the data transfer limiter block software by polling a register containing a value corresponding to specified number of instructions. In some implementation, the register may be part of the memory subsystem. In some implementation, the register may be in other portions of the integrated circuit device.

In response to determining that the certain number of instructions has been executed (525-Y), at block 535, the data transfer rate may be increased. For each increment of the data transfer rate, the data transfer limiter block software may add another number of permitted data transfer requests (e.g., a fixed number or a percentage of the maximum number of data transfer requests) to the current number of data transfer requests. Thus, the number of data transfer requests, and therefore data transfer rate, may be incrementally increased up to the maximum value of N data transfer requests.

In response to determining that the certain number of instructions has not been executed (525-N), at block 530, it may be determined whether a specified elapsed time has expired. For example, a value for the specified elapsed time may be set in the data transfer limiter block software. The elapsed time may be determined by the data transfer limiter block software by polling a register containing a value corresponding to the elapsed time. In some implementation, the register may be part of the memory subsystem. In some implementation, the register may be in other portions of the integrated circuit device. In response to determining that the specified elapsed time has not expired (530-N), the method may continue executing instructions at block 515.

In response to determining that the specified elapsed time has expired (530-Y), at block 535, the data transfer rate may be increased. For each increment of the data transfer rate, the data transfer limiter block software may add another number of permitted data transfer requests (e.g., a fixed number or a percentage of the maximum number of data transfer requests) to the current number of data transfer requests. Thus, the number of data transfer requests, and therefore data transfer rate, may be incrementally increased up to the maximum value of N data transfer requests.

In some implementations, one or more of blocks 520, 525, and 530 can be made optional. Furthermore, in some implementations, other events can be detected to trigger the data transfer rate increase in block 535.

At block 540, it may be determined whether the maximum data transfer rate has been reached. The number of permitted data transfer requests may be increased incrementally by the data transfer limiter block software until the number of permitted data transfer requests, and therefore the data transfer rate, equals the number of clock cycles N. The maximum data transfer rate may be determined by the data transfer limiter block software by polling a register containing a value corresponding to the maximum data transfer rate. In some implementation, the register may be part of the memory subsystem. In some implementation, the register may be in other portions of the integrated circuit device.

In response to determining that the maximum data transfer rate has not been reached (540-N), the method may continue executing instructions at block 515. In response to determining that the maximum data transfer rate has been reached (540-Y), the method may end.

It should be appreciated that the specific steps illustrated in FIG. 5 provide a particular software-based method of for reducing dynamic power by limiting data transfer requests according to another embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
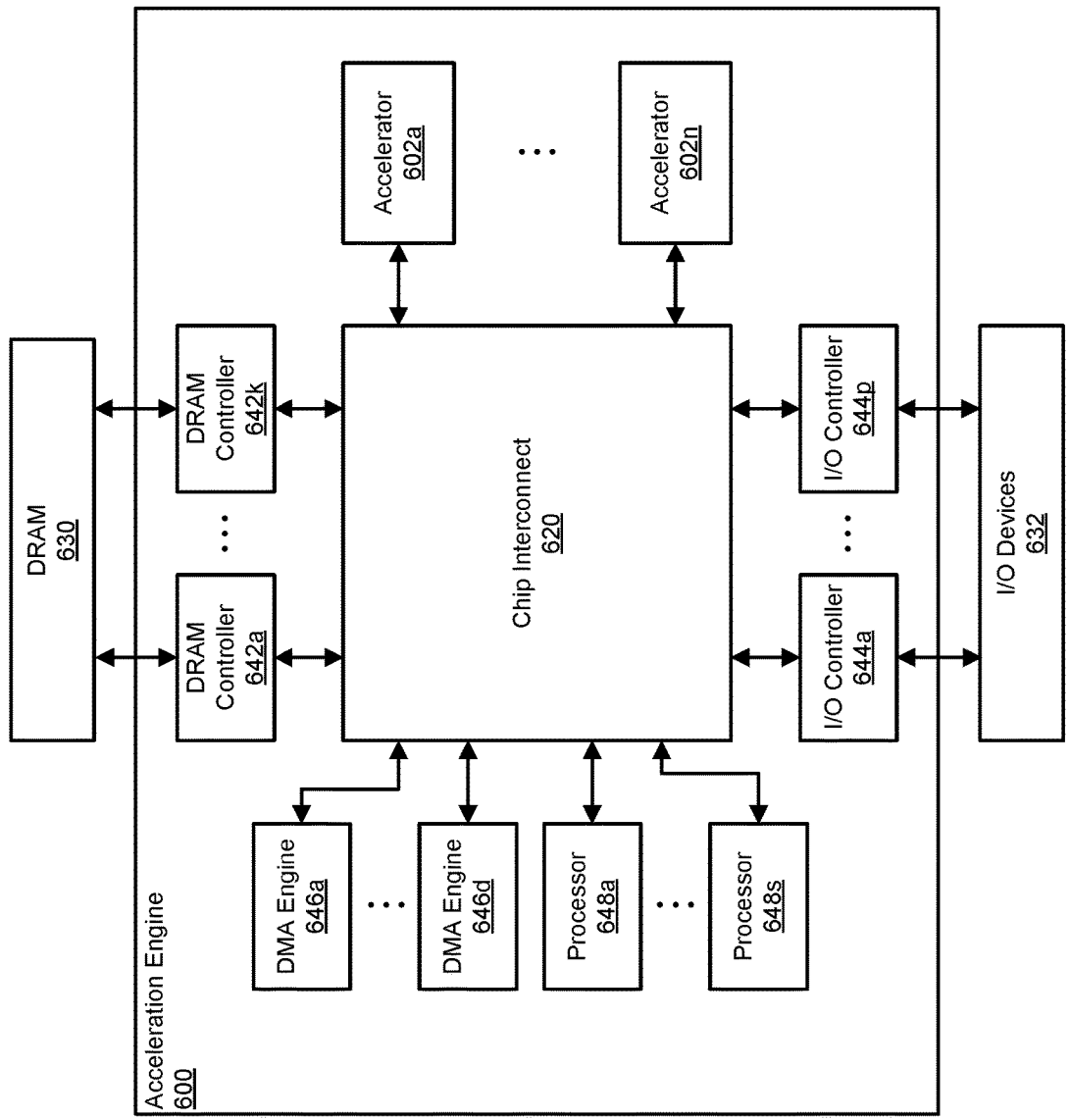
FIG. 6 includes a block diagram that illustrates an example of an acceleration engine according to some aspects of the present disclosure.

FIG. 6 includes a block diagram that illustrates an example of an acceleration engine 600. The acceleration engine 600 is an example of an integrated circuit that can include one or more accelerators $602a$-$602n$ that may be similar to the accelerator illustrated in FIG. 1.

In the example of FIG. 6, the acceleration engine 600 includes multiple accelerators $602a$-$602n$, each of which can perform a set of operations. In various examples, the accelerators $602a$-$602n$ are for particular types of operations, so that the accelerators $602a$-$602n$ can perform the operations much faster than when similar operations are performed by a general purpose processor. In various examples, to perform a set of operations, input data on which the operations are to be performed must first be moved into the accelerators $602a$-$602n$. Additionally, in some cases, program code is also moved into the accelerators $602a$-$602n$, which programs the operations that the accelerators $602a$-$602n$ will perform on the data. In the illustrated example, the acceleration engine 600 includes n accelerators $602a$-$602n$. Examples of accelerators that can be included in the acceleration engine 600 include graphics accelerators, floating point accelerators, neural network accelerators, and others. In various examples, the accelerators $602a$-$602n$ can each be the same (e.g., each of the is a graphics accelerator) or can be different (e.g., the accelerators $602a$-$602n$ include a graphics accelerator, a floating point accelerator, and neural network accelerator).

The example acceleration engine 600 further includes DRAM controllers $642a$-$642k$ for communicating with an external memory. The external memory is implemented, in this example, using DRAM 630. In the illustrated example, the acceleration engine 600 includes k DRAM controllers $642a$-$642k$, each of which may be able to communicate with an independent set of banks of DRAM. In other examples, other types of RAM technology can be used for the external memory. The DRAM controllers $642a$-$642k$ can also be referred to as memory controllers.

In various examples, input data and/or program code for the accelerators $602a$-$602n$ can be stored in the DRAM 630. Different programs can cause the accelerators $602a$-$602n$ to perform different operations. For example, when one of the accelerators is a neural network accelerator, one program can configure the neural network accelerator to perform speech recognition while another program can configure the neural network accelerator to perform image recognition. In various examples, different accelerators $602a$-$602n$ can be programmed with different programs, so that each performs a different set of operations. In various examples, the processors $648a$-$648s$ can manage moving of program code from the DRAM 630 to the accelerators $602a$-$602n$.

The example acceleration engine 600 further includes I/O controllers $644a$-$644p$ for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644*p* can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers $644a$-$644p$, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of data in the acceleration engine 600 can be managed by one or more processors $648a$-$648s$, which can also be referred to as data management processors. In the example of FIG. 6, the acceleration engine 600 includes s processors $648a$-$648s$ incorporated into the device (e.g., on the same silicon die). In other examples, the processors $648a$-$648s$ can be external to the acceleration engine 600 (e.g., on a different die and/or in a different package). In some examples, the processors $648a$-$648s$ can manage the movement of data from I/O devices 632 to the accelerators $602a$-$602n$ or the DRAM 630. For example, input data may be located at an I/O device 632 or in processor memory, and the processors $648a$-$648s$ can move the input from the I/O device 632 or processor memory into an accelerator or into DRAM 630. As another example, program code for the accelerators $602a$-$602n$ may be located on an I/O device 632 or in processor memory.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602n, or moving data between the I/O controllers 644a-644p and the accelerators 602a-602n. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602n, and DMA engines 646a-646d are determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
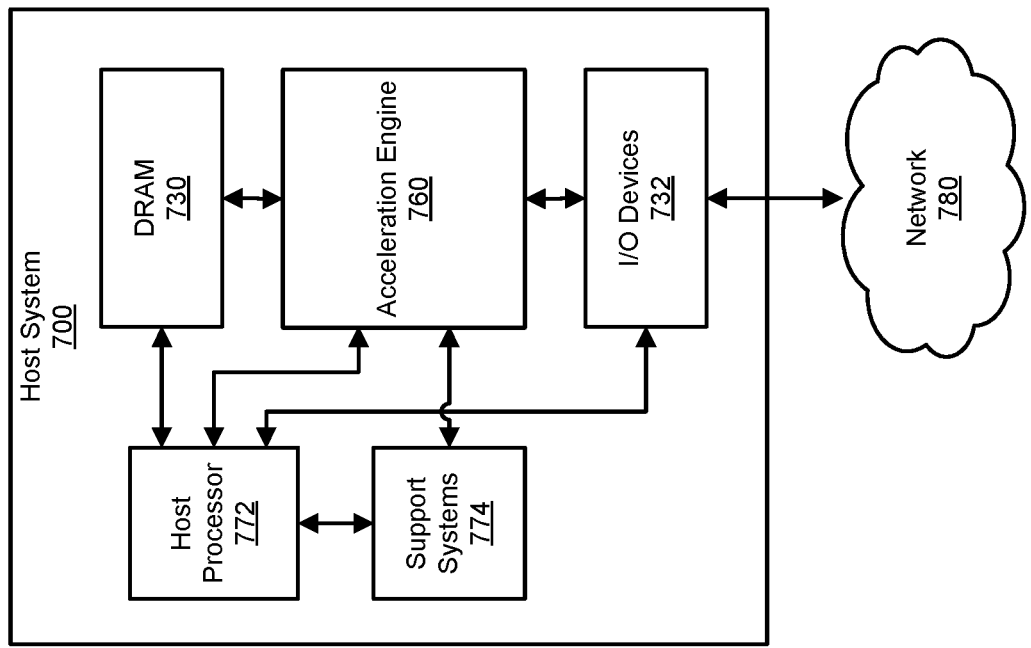
FIG. 7 includes a block diagram that illustrates an example of a host system according to some aspects of the present disclosure.

FIG. 7 includes a block diagram that illustrates an example of a host system 700 in which an acceleration engine 760 can be used. The acceleration engine 760 of FIG. 7 is an example of a device that can include one or more accelerators such as is illustrated in FIG. 6. The example host system 700 of FIG. 7 includes the acceleration engine 760, a host processor 772, DRAM 730 or processor memory, I/O devices 732, and support systems 774. In various implementations, the host system 700 can include other hardware that is not illustrated here.

The host processor 772 is a general purpose integrated circuit that is capable of executing program instructions. In some examples, the host processor 772 can include multiple processing cores. A multi-core processor may include multiple processing units within the same processor. In some examples, the host system 700 can include more than one host processor 772. In some examples, the host processor 772 and the acceleration engine 760 can be one chip, such as, one or more integrated circuits within the same package.

In various examples, the host processor 772 can communicate with other components in the host system 700 over one or more communication channels. For example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started an inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct an inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on.

The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 8:
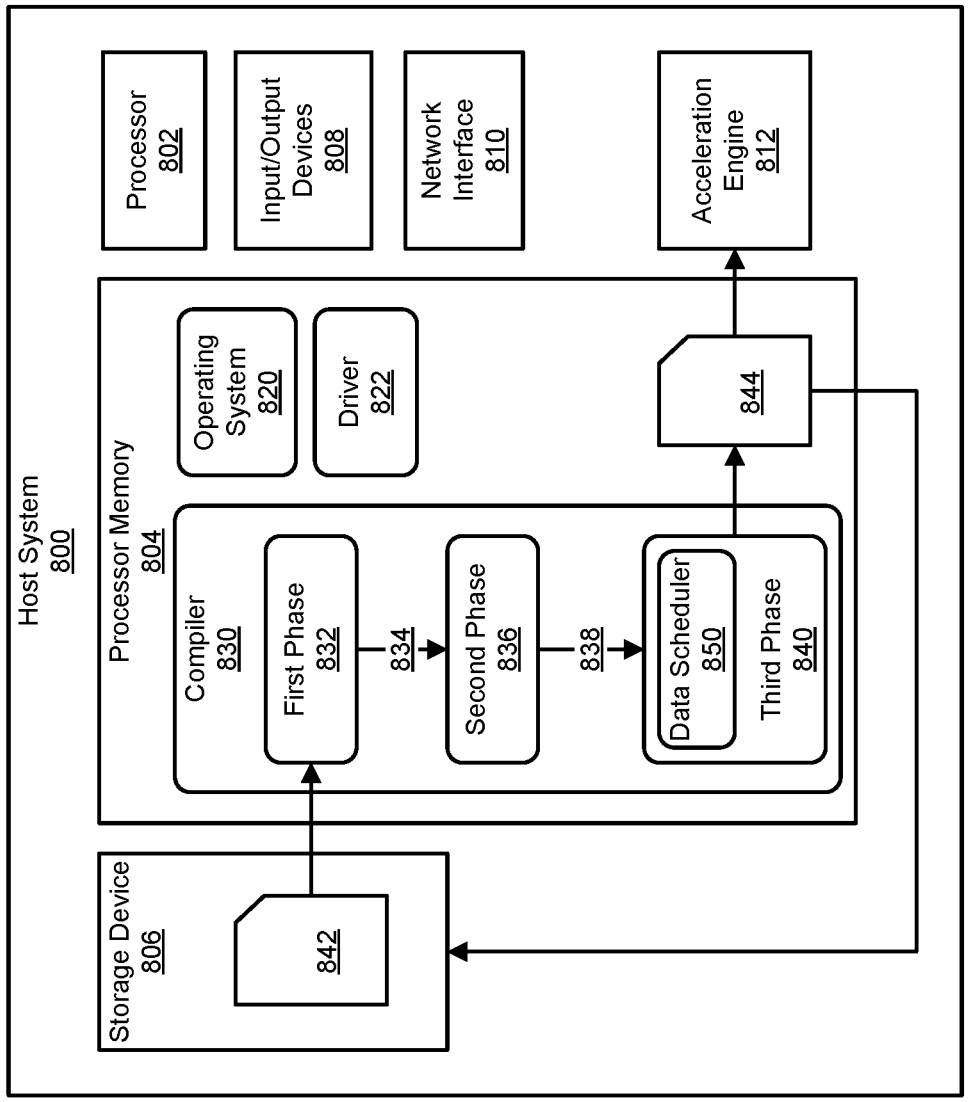
FIG. 8 includes a block diagram illustrating an example of a host system on which a compiler 830, such as is described herein, can run.

FIG. 8 includes a block diagram illustrating an example of a host system 800 on which a compiler 830, such as is described herein, can run. The illustrated host system 800 is an example of a computing device, and includes a processor 802, a processor memory 804, at least one storage device 806, various Input/Output (I/O) devices 808, and at least one network interface 810. In the example of FIG. 8, the host system 800 also includes an acceleration engine 812, which is an integrated circuit device that can accelerate certain operations or computations performed by the host system 800. In various examples, the host system 800 can be implemented as a server in a data center, a desktop computer, a laptop computer, a tablet computer, or a smartphone, among other examples. In some examples, operations or components discussed below as performed or included in the host system 800 can be performed or included in other computer devices. For example, the compiler 830 can execute on the host system 800 while the acceleration engine 812 is located at a different host system.

The processor 802 is an integrated circuit device that can execute program code, in the form of instructions. The program code can be for various software applications or tools, such as an operating system 820 or the illustrated compiler 830. While the processor 802 is executing a program, the instructions for the program can be stored in the processor memory 804. The instructions can also be stored elsewhere, such as on the storage device 806, and can be loaded into the processor memory 804 when needed by the processor 802. The processor 802 can also use the processor memory 804 for temporary storage of other data on which the processor 802 is operating. In various examples, the processor memory 804 is a volatile memory type, such as a type of Random Access Memory, though non-volatile memory types can, alternatively or additionally, be used for the processor memory 804.

The storage device 806 is an example of a device that can include non-volatile memory. For example, the storage device 806 can be a magnetic disk drive, a solid state drive, or an optical drive, among other examples. The storage device 806 can further be non-transitory, such that program code and other data stored on the storage device 806 remains present when the storage device 806 is not powered on.

The storage device 806 is one example of a peripheral device, which are components that can be coupled to the host system 800 to add functionality to the host system 800.

Other examples of peripheral devices include the Input/Output devices 808 and the network interface 810. The Input/Output devices 808 can include user input and output devices, such as keyboards, mice, touch screens, microphones, display screens, speakers, printers, and scanners, among other examples. The network interface 810, which can be implemented using a network interface card, can provide access to one or more networks. The network interface 810 can include, for example, a physical port for connecting a network cable and/or wireless antennas for communicating with Wi-Fi and/or cellular networks. The network interface 810 can also be described as an I/O device.

The acceleration engine 812 is also another type of peripheral device or I/O device. The acceleration engine 812 is a device that is purpose built to perform certain operations that can be performed by the processor 802, but can be performed faster by the acceleration engine 812. For example, the acceleration engine 812 can be a neural network accelerator, and, as such, may be able to perform the large scale, parallel computations of a neural network more efficiently than when the computations are performed by the processor 802. As another example, the acceleration engine 812 can be a graphics processing unit (GPU), and may be optimized to perform the computations needed for graphics rendering. Other examples of devices that can be implemented by the acceleration engine 812 include cryptographic accelerators, compression and decompression accelerators, 3-D accelerators, regular expression accelerators, security accelerators, and others.

In various examples, the acceleration engine 812 can execute program code to perform certain operations. For example, when the acceleration engine 812 is a neural network accelerator, the acceleration engine 812 can be programmed to execute a particular neural network, such as one that performs image recognition or one that performs machine translation. As a further example, to support the execution of a neural network, the acceleration engine 812 can be programed to perform operations such as copying data for the neural network from processor memory 804 (for example) into the acceleration engine 812, copying input data for the neural network from processor memory 804 into the acceleration engine 812, and/or copying results from the acceleration engine 812 into the processor memory 804, among other examples.

To generate program code for the acceleration engine 812, in various examples, the host system 800 can execute the compiler 830. Compilers, in general, are software programs that translate program code written in a human-readable language into a format (e.g., machine instructions) that can be read and processed by an integrated circuit device. In the example of FIG. 8, the acceleration engine 812 is a neural network accelerator and the compiler 830 is for compiling a neural network description into instructions to be executed by the acceleration engine 812. When the acceleration engine 812 implements a different type of accelerator, another compiler can be used.

The compiler 830 can be activated, for example, when the operating system 820 receives keyboard, mouse, touchscreen, voice commands, or other inputs from the Input/Output devices 808. The inputs can further include parameters for the compiler 830, such as the input code 842 to compile and configuration options for the compilation process. Once the compiler 830 is activated, the processor 802 can load the instructions for the compiler 830 into the processor memory 804, and can execute the instructions.

In the example of FIG. 8, the compiler 830 includes a first stage 832, a second stage 836, and a third stage 840, which each perform different operations to produce compiled code 844. In other examples, the compiler 830 can combine the operations of the first stage 832, second stage 836, and/or third stage 840 into fewer stages, or can divide the operations of one of the stages into multiple stages.

The first stage 832 can receive and process input code 842. The input code 842 can describe a program in a high-level programming language, such as Java, C++, or Tensorflow, among many other examples. The input code 842 can describe, for example, steps to perform image recognition, speech recognition, machine translation, or other operations. The input code 842 can be obtained, for example, from the storage device 806. Alternatively, though not illustrated here, the input code 842 may be located in the processor memory 804 or can be obtained from a network location, using the network interface 810. Processing of the input code 842 can include sorting the operations described in the input code 842 into layers, where the outputs of one layer provide the inputs to a next layer. Processing can also include identifying steps to be performed by the processor 802, rather than by the acceleration engine 812. For example, the processor 802, through the execution of a driver 822, may need to perform steps such as configuring Direct Memory Access (DMA) descriptors for moving data into or out of the acceleration engine 812, among other examples.

The output 834 of the first stage 832 can be organized, for example, in the layers, nodes, and connections between nodes of a neural network. The second stage 836 can perform intermediate processing on this output 834. For example, the operations performed in any one layer, or at any one node in a layer, may be too many for the acceleration engine 812 to perform at the same time. The acceleration engine 812 may, for example, have a limited amount of locale storage space for the data needed for a computation, or the computations may be more than the acceleration engine 812 can perform at one time. In this example, the first stage 832 can break the operations of the layer or node down into smaller operations, which can fit into the acceleration engine's local memory and/or can fit into the computing capacity of the acceleration engine 812. Processing of the output 834 of the first stage 832 can include other steps, such as scheduling, or determining the order in which the acceleration engine 812 and/or processor 802 will perform operations, among other examples.

In various examples, the output 838 of the second stage 836 includes the various steps to be performed by components of the acceleration engine 812, in the order that the steps are to be performed. The output 838 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 840 can operate on the output 838 of the second stage 836, and perform various steps before producing the instructions that are to be executed by the acceleration engine 812. These steps can include, for example, removing redundant dependencies, resolving or handling dependencies between nodes by inserting synchronization instructions into the code, identifying possibly optimizations in memory usage or memory bandwidth usage, and other operations.

In some examples, the third stage 840 can include a data scheduler 850.

The output of the third stage 840 is compiled code 844, which may include machine instructions in binary format. In some examples, the compiled code 844 can be stored in the processor memory 804. Alternatively or additionally, the compiled code 844 can be copied to the storage device 806 or to a network location. As noted above, the acceleration engine 812 may be located at a different host system, in which case the compiled code 844 can be sent over the network interface 810 to the other host system.

In the example of FIG. 8, the host system 800 can be executing a driver 822, which can also be referred to as a device driver or runtime driver, that manages the acceleration engine 812. The driver 822 can provide an interface between applications executing on the host system 800 (or on another host system) and the acceleration engine 812. For example, the driver 822 can provide an Application Program Interface (API) that defines functions for feeding input data to the acceleration engine 812 and defining the operation to perform on the input data. In this and other examples, the driver 822 can configure the acceleration engine 812 to perform the operation. For example, the driver 822 can identify a neural network that the acceleration engine 812 is to execute, as well as the location in the processor memory 804 or on the storage device 806 where the compiled code 844 for the neural network is located. The driver 822 can further load into the acceleration engine 812 or cause the acceleration engine 812 to load the compiled code 844, can load or cause the acceleration engine 812 to load the input data on which the neural network is to operate, and/or can cause the acceleration engine 812 to being executing on the input data. Once the acceleration engine 812 has finished, the acceleration engine 812 can notify the driver 822, and the driver 822 can deliver a result back to the application that requested the result.

Figure 9:
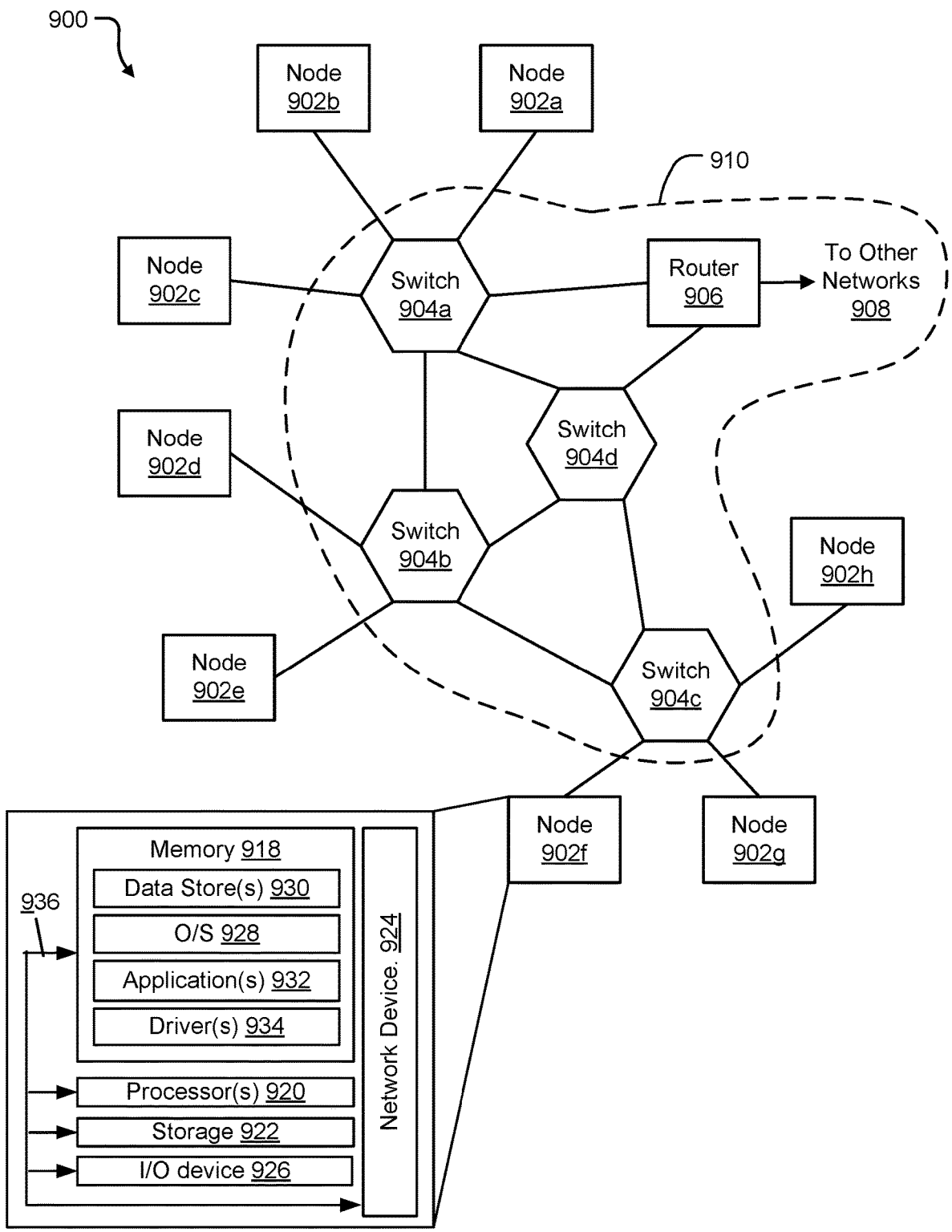
FIG. 9 includes a diagram that illustrates an example network according to some aspects of the present disclosure.

FIG. 9 includes a diagram of an example network 900, which can include one or more host systems, such as the host system illustrated in FIG. 7. For example, the example network 900 of FIG. 9 includes multiple nodes 902a-902h, one or more of which can be a host system such as is illustrated in FIG. 7. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device, comprising:
   a memory subsystem;
   a set of execution engines; and
   a set of data transfer limiter blocks configured to control dynamic power dissipation of the integrated circuit device by controlling a number of data transfer requests from the set of execution engines that are permitted to reach the memory subsystem during a length of a window, each of the set of data transfer limiter blocks associated with an execution engine, each of the set of data transfer limiter blocks including:
      a window length counter configured to count a specified first number of clock cycles defining the length of the window;
      a window counter configured to count a specified second number of windows having the specified first number of clock cycles; and
      a rate increment counter configured to permit an initial number of data transfer requests to reach the memory subsystem,
   wherein the window length counter is further configured to increment the window counter when the specified first number of clock cycles is reached,
   the window counter is further configured to increment the rate increment counter when the specified second number of windows is reached, and
   wherein the rate increment counter is further configured to increase the number of data transfer requests permitted to reach the memory subsystem per window by a specified amount when the window counter increments the rate increment counter.

2. The integrated circuit device of claim 1, wherein each data transfer limiter block is disposed in a communication path between the memory subsystem and a corresponding execution engine associated with the data transfer limiter block.

3. The integrated circuit device of claim 1, wherein each of the data transfer limiter blocks is disposed in the memory subsystem.

4. The integrated circuit device of claim 1, wherein the specified amount to increase the number of data transfer requests permitted to reach the memory subsystem per window is equal to the initial number of data transfer requests permitted to reach the memory subsystem.

5. An integrated circuit device, comprising:
   a memory subsystem;
   an execution engine; and
   a data transfer limiter block associated with the execution engine, the data transfer limiter block including a set of counters operable to control a number of data transfer requests from the execution engine permitted to reach the memory subsystem in a specified period of time, wherein the set of counters is configured to incrementally increase the number of data transfer requests permitted to reach the memory subsystem from an initial number of data transfer requests to a maximum number of data transfer requests.

6. The integrated circuit device of claim 5, wherein the set of counters comprises:
   a window length counter configured to count a specified first number of clock cycles of the integrated circuit device, the specified first number of clock cycles defining the specified period of time as a window during which the number of data transfer requests is permitted to reach the memory subsystem;
   a window counter configured to count a specified second number of windows having the specified first number of clock cycles; and
   a rate increment counter configured to set a current number of data transfer requests permitted to reach the memory subsystem within a window.

7. The integrated circuit device of claim 6, wherein the window length counter is further configured to, when a window length count of the window length counter reaches the specified first number of clock cycles:
   generate a window length count reset signal to reset the window length count to zero; and
   resume counting the clock cycles,
   wherein the window length count reset signal is operable as a window counter increment signal to increment the window counter.

8. The integrated circuit device of claim 7, wherein the window counter is further configured to, when a window count of the window counter reaches the specified second number of windows:
   generate a window count reset signal to reset the window count to zero; and
   resume counting windows,
   wherein the window count reset signal is operable as a rate increment counter increment signal to increment the rate increment counter.

9. The integrated circuit device of claim 8, wherein the rate increment counter is further configured to, when a second signal is received:
   determine whether the current number of data transfer requests permitted to reach the memory subsystem per window is equal to the maximum number of data transfer requests permitted to reach the memory subsystem per window, and
   in response to determining that the current number of data transfer requests is not equal to the maximum number of data transfer requests, increase the current number of data transfer requests permitted to reach the memory subsystem per window by a rate increment factor.

10. The integrated circuit device of claim 9, wherein the rate increment factor is configured as a number of data transfer requests or a percentage of the maximum number of data transfer requests.

11. The integrated circuit device of claim 6, wherein the maximum number of data transfer requests in the specified period of time is equal to a number of clock cycles in the window.

12. The integrated circuit device of claim 5, wherein data transfer limiter block is disposed in the memory subsystem in a communication path between the execution engine and the memory subsystem.

13. The integrated circuit device of claim 5, wherein the execution engine is a processing element array, an activation engine, or a pooling engine.

14. A method for controlling dynamic power dissipation of an integrated circuit device having an execution engine and a memory subsystem, the method comprising:
   setting, by a runtime driver program, a window length of a window, a number of windows, a rate increment factor, and an initial number of data transfer requests per window permitted to be received by the memory subsystem from the execution engine;
   determining, by a data transfer limiter block, whether a window length count for the window is equal to a first number of clock cycles of the integrated circuit device defining the window length;
   in response to determining that the window length count is equal to the first number of clock cycles, incrementing, by the data transfer limiter block, a window count;
   determining, by the data transfer limiter block, whether the window count is equal to a second number of windows;
   in response to determining that the window count is equal to the second number of windows, increasing, by the data transfer limiter block, a current number of data transfer requests per window according to the rate increment factor.

15. The method of claim 14, further comprising, in response to determining that the window length count is equal to the first number of clock cycles, resetting the window length count to zero and resuming the window length count.

16. The method of claim 14, further comprising, in response to determining that the window count is equal to the second number of windows, resetting the window count to zero and resuming the window count.

17. The method of claim 14, wherein the rate increment factor is configured as a number of data transfer requests or a percentage of a maximum number of data transfer requests.

18. The method of claim 17, wherein increasing the current number of data transfer requests per window by the rate increment factor is performed up to the maximum number of data transfer requests per window.

19. The method of claim 14, wherein a maximum number of data transfer requests per window is equal to the first number of clock cycles defining the window length.

20. The method of claim 14, wherein the execution engine is a processing element array, an activation engine, or a pooling engine.

* * * * *